July 29, 1958 L. A. PFANKUCH ET AL 2,845,233
SAFETY APPARATUS
Filed Feb. 10, 1953 2 Sheets-Sheet 1
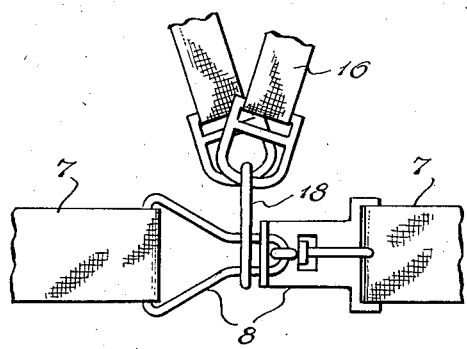
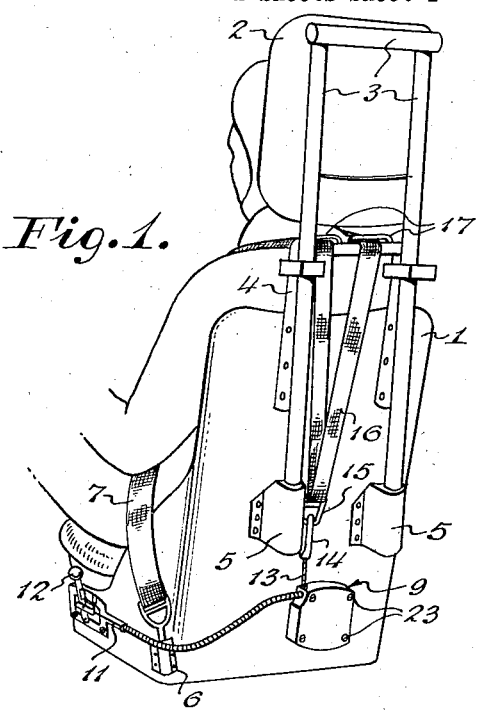
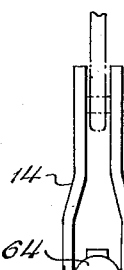
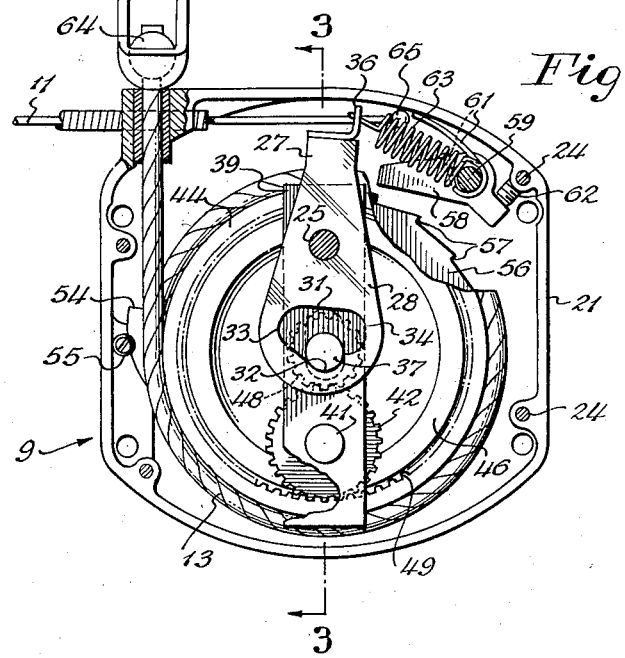
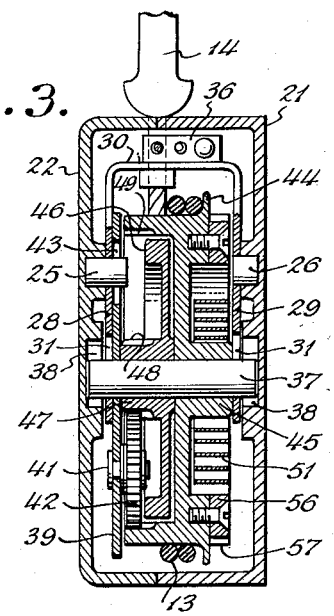
INVENTORS
LEO A. PFANKUCH
ROBERT J. WRIGHTON
BY
Paul B. Hunter
ATTORNEY July 29, 1958 L. A. PFANKUCH ET AL 2,845,233
SAFETY APPARATUS
Filed Feb. 10, 1953 2 Sheets-Sheet 2
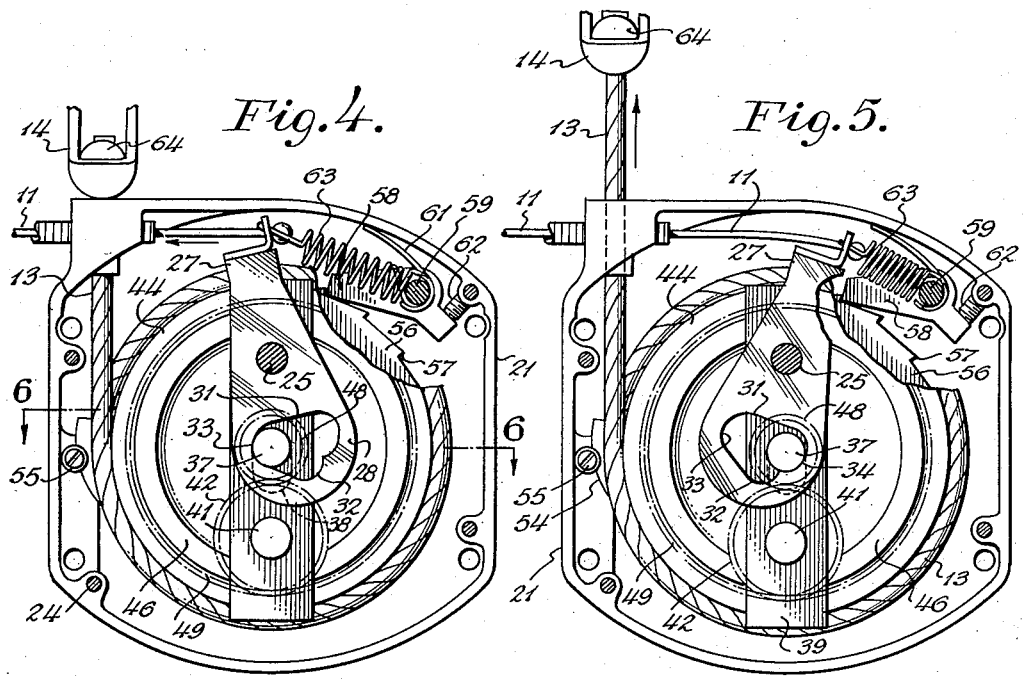
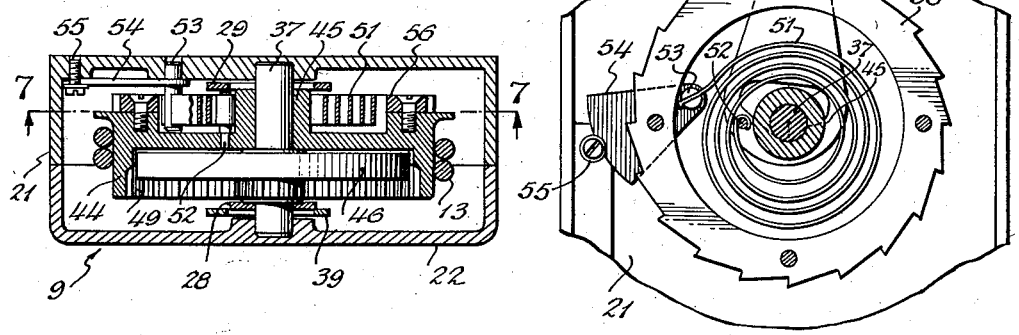
INVENTORS
LEO A. PFANKUCH
ROBERT J. WRIGHTON
BY
Paul B. Hunter
ATTORNEY United States Patent Office 2,845,233
Patented July 29, 1958

2,845,233

SAFETY APPARATUS

Leo A. Pfankuch, La Canada, and Robert J. Wrighton, Tarzana, Calif., assignors, by mesne assignments, to Pacific Scientific Aeroproducts, Glendale, Calif., a corporation of California Application February 10, 1953, Serial No. 336,126

13 Claims. (Cl. 242—107.4)

This invention relates, generally, to novel safety apparatus for use by pilots, operators, and other crew members, such as bombardiers, navigators, gunners, etc. of rapidly moving vehicles such as aircraft and automobiles and, more particularly, to novel inertia-operated apparatus for use with body harnesses which apparatus automatically functions to safely retain the pilots in their seats during crashes and the like.

Safety apparatus of this type have been developed over the years and comprise devices for use in conjunction with a shoulder harness which permit movement of the shoulder harness and consequently movement of the upper portion of the pilot's body during normal motions of his craft but which automatically operate to restrict movement of the shoulder harness and pilot during abnormal or violent motions of the craft. These devices ave taken the form of reels or drums with a cable wound thereon, the cable being secured to the shoulder harness. The cable is reeled off the drum in response to tension on the shoulder harness and rewound on the drum when the tension is removed. During abnormal motions of the craft, the device automatically operates to lock up the reel and prevent the cable from reeling out, thus restricting the movement of the shoulder harness.

These heretofore existing devices suffer from several serious defects. One defect of the known devices is that they operate to restrain movement of the associated shoulder harness only when the violent movement of the craft is in the direction of the longitudinal axis of the craft. For example, assume that an aircraft crashes head on into an obstruction while landing. The violent movement, in this case the rapid deceleration of the craft, is in the longitudinal direction of the aircraft and the known devices will operate to keep the pilot from pitching forward. But now assume that one of the plane's wings strikes an obstruction while landing and turns the plane sideways. The rapid deceleration of the aircraft would still be in the direction the plane was traveling when landing but the plane would also be moving sideways of this direction. Since the direction of deceleration of the craft is perpendicular to the longitudinal axis of the aircraft, the known devices would fail to operate to restrain the shoulder harness and the pilot's head would crash against the side of the cockpit or cabin.

Another defect of the known devices is that they must be secured in the craft only in certain predetermined positions to insure desired operation. An error in properly locating these devices in the craft ofttimes result in their failure to operate.

Another defect in many of the known devices is that after they automatically operate to lock the shoulder harness in the position the harness occupied when a large jerk was first exerted on the harness, the devices will not then operate to take up slack in the harness when the force or pull on the harness is relaxed or removed. To further explain, these known devices will operate to take up slack during normal motions of the pilot. If he leans forward, thus pulling the shoulder harness along with him, and then leans back, the known devices will take up the slack and retain the harness against the pilot's body. However, if the pilot is leaning forward when a crash occurs, the deceleration of the plane's motion will cause the known devices to automatically operate and lock the harness in the position the harness occupied at that instant. Since the pilot was leaning forward at the instant of automatic locking, there is a great deal of slack in the harness when the pilot resumes an upright position. Since this slack is not automatically taken up, the upper portion of the body may subsequently be thrown about to the extent permitted by the locked shoulder harness. This freedom of movement is enough to cause serious injury.

Still another defect of known devices is that they employ a weighted body or member to react to the violent movements of the craft to automatically lock the shoulder harness cable. Since it is the movements of the pilot's body which is of sole importance and since the forces acting on the pilot's body may be substantially different from the forces acting on the weighted member, the solution to this safety problem which these known devices offer is inadequate. To illustrate, a sudden deceleration of the craft may bring forces to play at the point of the pilot's head and shoulders different and distinct from those forces exerted at the point where these known devices are mounted. In this case, the heavy body may not be acted upon to lock up the reel and the pilot's head would in such case crash against the instrument panel or other obstruction. A more logical and dependable solution is to make the operation of the inertia device directly dependent on the forces exerted on the pilot's body.

Still another defect of the known devices is that they unnecessarily hamper the pilot during normal movements and in addition are too limited in the amount of force which they are able to withstand before fracturing.

Therefore, it is a principal object of this invention to provide a novel safety device which will automatically operate to lock the associated shoulder harness regardless of the direction of the abnormal motion of the craft, such as rapid deceleration.

Another object of this invention is to provide a novel safety device which will automatically operate to lock the associated shoulder harness directly in response to movements of the pilot's body.

Another object of this invention is to provide a novel safety device which will automatically operate to lock the associated shoulder harness directly in response to movement of the pilot's body regardless of the direction of movement thereof.

Another object of this invention is to provide an inertia-operated safety device for use in feeding out and reeling in shoulder harness cable wherein the cable reel operates in response to normal loads on the cable to rotate and feed-out the cable and wherein the cable reel operates in response to loads on the cable above normal to lock itself up and prevent the feeding out of cable.

A further object of this invention is to provide a safety device wherein the cable reel is rotatably movable with respect to a predetermined axis in response to normal tensions or loads on the cable to reel and unreel the cable and is radially movable with respect to said axis in response to loads greater than normal on the cable to lock the reel.

Another object of this invention is to provide an inertia-operated safety device of the character described wherein a single spring provides the power for rotating the cable reel or drum to wind the slack cable thereon and also the power for restraining the cable reel from the locked position.

Still another object of this invention is to provide a novel safety device which may be automatically or manually locked up to prevent paying-out of harness cable, the device nevertheless being able to gather in cable while preventing feeding it out.

These and other objects will become apparent after perusal of the following description of the embodiment of this invention disclosed in the drawings wherein Fig. 1 shows the embodiment of this invention mounted on the rear of a pilot seat and the associated shoulder harness.

Fig. 1A shows the lap and shoulder harness buckle used to secure the straps in front of the pilot.

Fig. 2 is a plan view of the apparatus embodying this invention with the cover removed. The apparatus is shown in its normal position in readiness for either manually or automatically locking the shoulder harness cable.

Fig. 3 is a transverse sectional view of the apparatus along section lines 3—3 in Fig. 2 looking in the direction of the arrows.

Fig. 4 is a plan view of the apparatus similar to that of Fig. 2 showing the apparatus in the manually locked position.

Fig. 5 is a plan view of the apparatus similar to that of Figs. 2 and 4 showing the apparatus in the automatically locked position.

Fig. 6 is a sectional view along section lines 6—6 in Fig. 4 looking in the direction of the arrows.

Fig. 7 shows a portion of the novel structure of this embodiment of the invention comprising the power spring and the means for varying the amount of force it exerts on the cable reel.

Referring now to Fig. 1, there is shown a view from the side and rear of a pilot seated in a seat 1 of the type found in aircraft. The framework of the seat is preferably metal and is securely fastened to the chassis of the aircraft. A padded headrest or support 2 is secured to the back of the seat frame by a metal brace network comprising rods 3 and 4 and brackets 5. Fixedly secured to the side of the seat frame by brackets such as 6 is a safety belt or strap 7 which extends across the lap of the pilot and is buckled at the midpoint by a conventional type buckle 8 as shown in Fig. 1A. Secured on the lower portion of the back of the seat frame is a novel safety apparatus 9 which embodies this invention. A small sheathed wire 11 extends through the side of the apparatus 9 to a lever 12 mounted at the side of the seat frame for providing manual control of this apparatus by the pilot. A wire cable 13 extends through the top of the apparatus 9 and is securely fastened by link 14 to link 15 through which passes a shoulder strap or harness 16. The two runs of this strap pass through the two metal rings or guides 17 rigidly attached to the round metal brace 4, each run passing over a separate shoulder of the plot and being brought together and securely fastened to the lap buckle 8 by a link 18 as shown in Fig. 1A.

Briefly explaining this invention with reference to Fig. 1, as the pilot leans forward or sideward in his seat in controlling his craft, the novel apparatus 9 plays out the harness cable 13. When the pilot again relaxes in his seat, the apparatus reels the cable in, thus keeping the shoulder harness 16 taut at all times while permitting freedom of movement of the pilot. However, if the pilot is thrown forward or sideways in a violent motion, the apparatus automatically operates to lock the cable and prevents it from reeling out. In the present embodiment, the cable 13 will be locked up before it has traveled one inch. Assuming the pilot had been leaning forward at the time the violent motion was initiated, in which position the cable 13 is extended when the pressure of the pilot's body on the shoulder harness relaxes, as when he straightens up, the apparatus reels up the slack in the cable that was out at the time of the locking of the apparatus. The pilot, by means of lever 12, may also manually lock the cable when he so desires. A more complete and detailed explanation of the operation of this novel apparatus will be subsequently given.

The novel apparatus disclosed in Figs. 2 through 7, inclusive, embodying this invention comprises a metallic case made up in two sections, a base section 21 and a cover section 22, adapted to be fastened together as by screws 23 such as shown in Fig. 1 which also serves to fasten the case to the seat frame. Proper alignment of the base 21 and cover 22 is insured by providing holes in the cover 22 and dowel pins 24 in the base 21 arranged to engage the holes. The inside surfaces of the base and cover have raised portions adapted to support or define the movement therein of mechanical elements arranged within the case. Fixedly secured in the inside wall of the cover is a pivot pin 25 and directly across from this pin 25 is a second pivot pin 26 securely fastened in the inside wall of the base. Mounted on the pivot pins 25 and 26 is a U-shaped lever 27 comprising side legs 28 and 29 and a cross-piece 30. The lower ends of the legs 28 and 29 widen to accommodate cam-like openings 31, each opening forming three mutually spaced slots or recesses 32, 33 and 34. This lever is free to pivot about the pivot pins 25 and 26. Affixed as by welding to the upper surface of the cross-piece is an L-shaped bracket member 36 having three small openings in one leg thereof, the functions of which will be hereinafter explained. Passing through the openings 31 in the lever and resting in the lower slot 32 of each opening is a center pin 37. The ends of the center pin extend into vertical slots 38 in the inside wall of the cover and base, these slots being shaped so as to permit the center pin 37 to move vertically within the case but not horizontally, the distance of movement being fixed by the lower surfaces of the lower slots 32 in the lever and the upper surfaces of the slots 38.

Movably mounted on the center pin 37 adjacent to one of the legs of the lever 27 is a rectangular-shaped idler arm 39. Rotatably mounted on the lower portion of the idler arm 39 by means of a pin 41 and associated spacer washers and retaining clip is an idler gear 42. A vertically extending slot 43 is located in the upper portion of the idler arm 39, this slot being used in conjunction with the pivot pin 25 to prevent the idler arm 39 from pivoting or turning about the center pin 37. The vertically extending slot 43 permits the idler arm 39 to move vertically with the center pin 37. Rotatably mounted on the center pin 37 is a metal cable drum or reel 44, the drum being machined so as to have recesses therein on either side thereof, one of said recesses being annular-shaped to define a hub portion 45 extending from one side of the drum 44. The drum is mounted within the legs of the lever 27 with its hub portion 45 adjacent to the inside surface of leg 29 thereof.

A metal flywheel or inertia wheel 46 with an extending hub portion 47 is rotatably mounted on the center pin 37 within one of the recesses of and back-to-back with the cable drum 44. A plurality of gear teeth 48 encircle the hub portion 47 of the flywheel or inertia wheel 46 and mesh with the gear teeth of the idler gear 42. A plurality of gear teeth 49 are also cut into the inner peripheral surface of the cable drum recess, the idler gear teeth also meshing with these drum teeth. The gear ratio of the drum teeth, the idler gear teeth and the flywheel teeth are such that preferably for every four revolutions of the flywheel, the cable drum makes one revolution.

Encircling the hub portion 45 of the cable drum 44 is a spiral power spring 51, the inner end of which is fixedly secured on a dowel pin 52 (see Figs. 6 and 7) securely mounted in and extending from the web of the cable drum. The other end of the spiral power spring is securely fitted within a slit in the metal pivot pin 53 rotatably mounted in the raised inner surface of the base. Fixedly mounted on the pivot pin 53 is a fan-shaped anchor plate 54, the curved edge of which extends under the head of a lock screw 55. When this lock screw 55 is loosened, the fan-shaped anchor plate 54 and associated pivot pin 53 may be rotated to bend or unbend the outer end of the power spring 51 and thus increase or decrease the tension of the spring for purposes to be hereinafter explained. When the desired tension is attained, the lock screw 55 may be tightened to retain the anchor 54 and pivot pin 53 fixed.

Securely mounted as by screws on the side of the cable drum encircling the power spring 51 is an annular locking ring 56 having ratchet teeth 57 around the outer periphery thereof. A locking pawl or dog 58 is adapted to engage the ratchet teeth 57 on the locking ring 56 and is rotatably mounted on a pivot pin 59 which is securely fastened in the inner wall of the base. A pawl spring 61 urges the pawl 58 in a counter-clockwise direction looking at Fig. 2, the extent of rotation of the pawl 58 and resultant spacing from the ratchet teeth 57 being determined by an adjustable set screw 62.

One end of a tension spring 63 is mounted on the pivot pin 59 and the other end extends through two of the openings in the L-shaped bracket member 36. This tension spring urges the lever 27 in a clockwise direction looking at Fig. 2.

The small strong cable 13 is wound on the cable drum 44 with one end of the cable secured to the drum and the other end extending through a small opening in the case and ending in a ball termination 64 fitted into the cup of the link 14. A second small strong cable or wire 11 extends from the manual lever at the pilot's side through a second opening in the case and then through the third opening in the L-shaped bracket member, ending in a ball termination 65.

A detailed explanation of the operations of this novel device embodying this invention will now be given with reference to its use by a pilot in an aircraft. The apparatus is shown in its normal operating position in Figs. 2 and 3, that is to say, when it has not been manually nor automatically locked. As the pilot moves about in his seat to control his craft, his shoulder harness likewise moves and pulls on the cable 13. The cable unwinds from the cable drum 44, the drum rotating clockwise on the center pin 37 and, through the idler gear 42, rotating the flywheel 46 which performs no useful function at this time. The locking ring 56 rotates with the cable drum 44 but is spaced from and therefore does not engage the pawl 58. Because of the novel construction of this device, a pull of only six to eight pounds is required to unwind the cable 13 from the drum as compared to a pull of twelve pounds required on safety apparatus now in general use. When the pull on the cable relaxes, the cable drum is rotated counter-clockwise by the power spring 51, thus reeling up the cable slack. The novel apparatus will continue to operate in this fashion until it is either manually or automatically locked.

Should the pilot desire to safely secure himself in the seat when, for example, a crash is imminent, he leans back in the seat and the slack in the shoulder harness is taken up by the safety device 9 as explained above. The pilot then pushes forward the lever 12 to move the wire 11 to the left looking at Fig. 2. The ball termination 65 engages the member 36 and rotates the lever 27 counter-clockwise about the pivot pins 25 and 26. The cam-like edges of the openings 31 in the lever 27 bear against and raise the center pin 37 and elements mounted thereon vertically until such time as the center pin 37 is located in the slot 33 of the opening. The position of the apparatus after this vertical movement is depicted in Figs. 4 and 6. One of the ratchet teeth 57 of the locking ring 56 is brought into engagement with the tip of the locking pawl 58. Clockwise rotation of the locking ring 56 and cable drum 44 is thus prevented and the cable 13 remains locked. This particular embodiment is designed to withstand a pull on the cable of up to 4000 pounds without releasing the locked cable. If the pilot manually locks the cable 13 while leaning forward, the power spring 51 will still rotate the drum 44 counter-clockwise when the pilot sits back to thereby reel in the slack cable, the pawl 58 falling in behind each successive ratchet tooth. To release from manual locking and return the apparatus to its normal position, the pilot pulls back on the control lever 12 to push the ball termination 66 from engagement with the bracket member 36. Lever 27 rotates clockwise under compulsion of the tension spring 63 and lowers the center pin 37 into the slot 32, the edges of which prevent further clockwise rotation of the lever.

The novel apparatus of this invention will automatically operate to lock up the cable 13 if the pilot does not manually lock it in case of excessive deceleration of the craft. In this case, the control lever 12 would be in its rearmost position. This safety device is so arranged that when any loading on the cable of an acceleration of a particular number of G's or over occurs, the cable will be locked up. Assume that the aircraft in landing strikes an object and decelerates rapidly, pitching the pilot forward in his seat, and that the pilot's body exerts a loading of this particular number of G's or more acceleration on the cable 13. Referring to Figs. 2 and 5, when the sharp jerk occurs on the cable, it tends to do two things to the cable drum 44, the first of which is to rotate the drum clockwise and the second of which is to lift the drum. Opposing rotation of the cable drum is its inertia. This inertia is actually built into the drum by gear coupling the drum to the flywheel or inertia wheel 46 through the idler gear 42 and, when sharp jerks occur on the cable 13, the inertia wheel 46 retards rotation of the cable drum, in other words, acts as an inertia brake. Opposing the tendency to lift the cable drum is the weight of the cable drum and associated apparatus mounted on the center pin 37 plus the downward pressure exerted on the drum by the power spring 51. This downward pressure of the power spring may be varied by adjusting the anchor plate 54 and pivot pin 53 to bend the end of the spring 51.

The components of this safety apparatus may be selected as to size, weight, etc. so that with a loading on the cable of an acceleration of any number of G's less than a particular set value the tendency of the jerk on the cable to rotate the cable drum will overcome the tendency to raise the drum before the drum has been lifted to the automatic lock position and the cable drum will therefore be rotated, while on the other hand with loading on the cable of an acceleration over the particular set number of G's the tendency to lift the drum will overcome the tendency to rotate it and the drum will be raised to the automatic lock position before it can be rotated any appreciable amount. The anchor plate 54 and pivot pin 53 are used to allow a fine point of balance to be reached by allowing for variation of the downward force of the power spring 51 on the cable drum.

When the loading on the cable is over the predetermined value, which in this embodiment may be taken to be two G's for example, the jerk on the cable 13 raises the cable drum and associated apparatus until the center pin 37 is on a level with the slot 34 in the opening 31 in lever 27. The tension spring 63 urges the lever 27 in clockwise rotation and the slot 34 is slipped around and under the center pin 37, holding the cable drum in this raised position. The pawl 58 engages the ratchet teeth 57 and prevents the cable drum from rotating, thus preventing the feeding out of harness cable 13. In actual tests on the present embodiment of this invention the pilot's body moved less than one inch before the cable reel 44 locked. In this automatically locked position, the apparatus will still reel in cable in the same manner as explained above when manually locked. To release from automatic lock, the pilot pushes forward on his control lever 12 thus causing the lever 27 to rotate and release the center pin 37 from slot 34, the center pin 37 and associated apparatus then dropping to rest in the normal position in slot 32 when the pilot returns the control lever 12 to its rearmost position.

It should be noted that the particular device embodying this invention may be mounted in any desired position in the craft such as under the seat provided the shoulder harness cable is not unduly hampered. This choice of position results from the fact that it is the pull on the cable that operates this inertia device rather than a weighted body component of the inertia device as in heretofore existing inertia devices.

It should also be clearly understood that the acceleration of the pilot's body needed to lock the reel may be in any direction with respect to the craft including frontwards, sidewards, vertically, etc. This novel invention may be used in connection with objects other than human bodies, such as, for example, freight handling and the like.

It is obvious that other possible embodiments of this invention may reel the shoulder harness straps directly on a reel or drum rather than to use a cable such as 13 between the harness and the reel. In the subsequent claims, it is intended that where the term "cable" is used it is meant to encompass cables, and equivalents such as, for example, wire, rope, strap, etc.

Since many changes could be made in the above construction of the safety device and many apparently widely different embodiments of this invention could be made without departing from the scope thereof, such as, for example, the elimination from the apparatus of the flywheel 46 and a modification of the remaining apparatus to provide the necessary mass for inertia operation, it is intended that all matter contained in the above description or shown in the accompanying drawings shall be interpreted as illustrative and not in a limiting sense. It is to be understood that the safety apparatus 9 need not be mounted upright but will operate satisfactorily in almost any angular position regardless of where the same is attached in the craft, the desired direction of extension of the harness cable 13 determining the angular position of the apparatus 9.

What is claimed is:

1. A safety device comprising a casing, a U-shaped lever having two leg portions, the lever being rotatably mounted in the casing, the lever having a pair of aligned openings in the lower ends of the two legs defining a plurality of opposed pairs of recesses, spring means for urging said lever in one pivoting direction, a center pin mounted on the lever through the openings with the ends of the pin extending into elongated slots in the casing, the pin being adapted to fit into any of the pairs of recesses, a cable reel mounted on the pin between the two legs, a cable wound on the reel, resilient means coupled to the cable reel and tensioned so as to wind the cable on the reel, the cable unwinding from the reel responsive to pulls on the cable below a predetermined acceleration, the center pin riding in one pair of said recesses during rotation of the cable reel in the unwind direction, an inertia wheel rotatably mounted on said center pin, means for gearing said inertia wheel to said cable reel whereby said wheel rotates with said reel during rotation below said predetermined acceleration, said inertia member restraining rotation of the reel at said predetermined acceleration to thereby cause said cable reel and center pin to be displaced radially, said pin moving within the confine of the slots in said casing, said lever pivoting under urging of said spring means to catch said center pin in another pair of recesses in said lever legs, said center pin and reel being held in said displaced position, and means operable upon said displacement to lock said cable reel from rotation in the unwind direction.

2. A safety device as claimed in claim 1 including manually operable means for pivoting said lever against the tension of said spring means whereby said center pin and reel is returned to the position in said first pair of recesses.

3. A safety device as claimed in claim 1 including a manually operated means for pivoting said lever against said spring tension to move said center pin into a third pair of aligned recesses in said lever legs, said locking means operable upon movement of said center pin and reel into said third pair of recesses to lock said reel against rotation in the unwind direction.

4. A safety device comprising a casing, a U-shaped lever having two leg portions, the lever being mounted in said casing, the lever having a pair of aligned openings in the lower ends of the two legs defining a plurality of opposed pairs of recesses, a center pin mounted on the lever through the openings and adapted to fit in any of the pairs of recesses, a cable reel mounted on the pin between the two legs, a cable wound on the reel, resilient means coupled to the cable reel tensioned so as to wind the cable on the reel, the cable unwinding from the reel responsive to pulls on the cable below a predetermined acceleration, the center pin riding in one pair of said recesses during rotation of the cable reel in the unwind direction, inertia means responsive to an acceleration of the cable equal to said predetermined acceleration for displacing said cable in a radial direction and thereby moving said center pin into a second pair of recesses, and means responsive to the movement to said second pair of recesses for locking said cable reel against further rotation.

5. A safety device as claimed in claim 4 wherein said lever is rotatably mounted in said casing, including resilient means for urging said lever in a rotational direction, said lever rotating upon movement of said center pin from said first pair of recesses to engage said center pin in said second pair of recesses and lock it therein.

6. A safety device as claimed in claim 5 including manually operable means for rotating said lever in the direction against said resilient means to restore said center pin into said first pair of recesses and thus unlock the cable reel.

7. Safety apparatus for preventing a seat occupant of a vehicle from being thrown off his seat, comprising an inertia lock device adapted to be mounted on the back of the seat, said device having a rotatably mounted reel therewithin, a flexible connector wound on said reel and extending outwardly of said device for passing over the body of the seat occupant, a yieldable resilient member coupled to said reel and tensioned so as to urge rotation of said reel in the direction to wind up the connector thereon to thereby normally maintain a light tension on said flexible connector while allowing the same to yield, whereby the seat occupant is permitted freedom of motion, an inertia member turnably movable with respect to said reel, means for connecting said inertia member with said reel, locking means within said device for locking said inertia member and reel against turning movement, movement of said flexible connector outwardly of said device at a rate exceeding a predetermined acceleration, due to a sudden force tending to dislodge the seat occupant, causing said inertia member to resist the turning of said reel and effect the locking of the reel and inertia member by said locking means, thus positively preventing further outward movement of the flexible connector to retain the seat occupant in his seat.

8. Safety apparatus as defined in claim 7, wherein said locking means comprises a plurality of ratchet teeth on said reel and rotatable therewith, and a pawl pivoted for engaging said ratchet teeth upon movement of said flexible connector at a rate exceeding said predetermined acceleration.

9. Safety apparatus adapted to be used on a moving vehicle, comprising, in combination, a supporting housing on said vehicle, a flexible connector extending from said supporting housing and adapted to engage an occupant in the vehicle, resilient reel means connected to said flexible member and carried within said housing for normally maintaining a light tension on said flexible connector while permitting the same to yield, whereby the occupant is allowed freedom of motion, an inertia member within said housing turnably mounted with respect to said reel means, means for coupling said inertia member to said reel means, locking means in said housing, said inertia member being operable by inertia to cause said locking means to lock said flexible connector positively against further movement outwardly with respect to said housing when said flexible connector is pulled outwardly of said housing at a rate exceeding a predetermined acceleration, due to forces tending to dislodge the occupant from his seat, whereby the occupant is prevented from being dislodged.

10. In a safety apparatus adapted to be used on a moving vehicle, in combination, a housing secured to said vehicle and having an opening therein, a flexible connector slidable through said opening and adapted to engage a passenger in the vehicle, a reel mounted in said housing upon which said flexible connector is wound, a resilient member acting upon said reel tending to wind said connector thereupon to draw the same into said housing to thereby apply a light tension to said connector while allowing the passenger freedom of motion, the mounting of said reel within said housing providing for radial movement of said reel as well as turning movement thereof, an inertia member having angular inertia mounted within said housing and coupled to said reel and turnable with respect thereto, a locking member within said housing for engaging and locking said reel upon radial movement of the latter therein, the application of a sudden pull to said connector causing the latter to move wih an acceleration exceeding a predetermined value, due to some force tending to throw the passenger from his seat, causing said inertia member to resist the turning movement of said reel and compel the latter to have a radial motion, thereby locking said reel to said housing by the action of said locking member and stopping the motion of said connector and retaining the passenger in his seat.

11. Safety apparatus as defined in claim 10, wherein means is provided within said housing for holding said reel in its radially displaced position, whereby said locking means prevents the unwinding of said reel, said locking means acting to permit the rewinding of said reel however upon the removal of excessive pull upon the flexible connector.

12. Safety apparatus as defined in claim 11, wherein manually operable connector means is provided adjacent the passenger and extending to said housing for disengaging said locking means and causing return of said reel to its normal unlocked position at the will of the passenger.

13. In a safety apparatus adapted to be used on a moving vehicle, in combination, a supporting housing secured to said vehicle, a flexible connector adapted to engage a passenger and extend into said housing, rotatably mounted reel means within said housing upon which said connector is wound, said reel means being tensioned so as to normally wind said connector thereupon to apply a light tension on said connector while permitting the same to yield, whereby the passenger is allowed freedom of motion, an inertia member turnable with respect to said reel means and gearing coupled thereto, said reel means being adapted to be moved radially with respect to its normal axis of rotation to a radially displaced locked position upon the passenger exerting a sudden pull on said connector and causing the latter to move with an acceleration exceeding a predetermined value, the inertia of said inertia member causing the reel means to move radially into locked relation with said housing, thereby locking the connector positively against further outward movement.

References Cited in the file of this patent
UNITED STATES PATENTS

| | | |
|---|---|---|
| 1,037,333 | Scheuer | Sept. 3, 1912 |
| 1,308,480 | Caouette | July 1, 1919 |
| 2,370,921 | Sharpe | Mar. 6, 1945 |
| 2,403,653 | Geoghegan et al. | July 9, 1946 |
| 2,434,119 | Nordmark | Jan. 6, 1948 |
| 2,546,202 | Trouin | Mar. 27, 1951 |